United States Patent
Sanghera et al.

(10) Patent No.: US 8,144,392 B2
(45) Date of Patent: Mar. 27, 2012

(54) WAVEGUIDE AMPLIFIER IN A SPUTTERED FILM OF ERBIUM-DOPED GALLIUM LANTHANUM SULFIDE GLASS

(75) Inventors: Jasbinder S Sanghera, Ashburn, VA (US); Ishwar D Aggarwal, Fairfax Station, VA (US); Jesse A. Frantz, Cheverly, MD (US); Leslie Brandon Shaw, Woodbridge, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1084 days.

(21) Appl. No.: 11/673,624

(22) Filed: Feb. 12, 2007

(65) Prior Publication Data
US 2008/0192332 A1 Aug. 14, 2008

(51) Int. Cl.
- *H03S 3/063* (2006.01)
- *H03S 3/16* (2006.01)
- *H04B 10/12* (2006.01)

(52) U.S. Cl. ............... 359/343; 385/129; 372/7; 372/40

(58) Field of Classification Search .................. 359/343; 385/129; 372/7, 40
See application file for complete search history.

(56) References Cited

U.S. PATENT DOCUMENTS

| | | | | |
|---|---|---|---|---|
| 4,087,159 A | * | 5/1978 | Ulrich | 385/129 |
| 5,107,538 A | * | 4/1992 | Benton et al. | 385/130 |
| 5,381,262 A | * | 1/1995 | Arima et al. | 359/341.1 |
| 5,677,769 A | * | 10/1997 | Bendett | 356/440 |
| 6,650,816 B2 | * | 11/2003 | Bazylenko et al. | 385/129 |
| 2003/0007763 A1 | * | 1/2003 | Bazylenko et al. | 385/129 |
| 2003/0063884 A1 | * | 4/2003 | Smith et al. | 385/129 |
| 2003/0118315 A1 | * | 6/2003 | Hewak et al. | 385/142 |
| 2004/0008959 A1 | * | 1/2004 | Haase et al. | 385/129 |

OTHER PUBLICATIONS

Frantz et al. "Waveguide amplifiers in sputtered films of Er3+-doped chalcogenide glass", Optical Fiber Communication Conference, 2006, OTuD4.pdf, 3 pp. (Mar. 2006).*

* cited by examiner

*Primary Examiner* — Eric Bolda
(74) *Attorney, Agent, or Firm* — Amy Ressing; Suresh Koshy

(57) ABSTRACT

A waveguide amplifier, disposed on a substrate, composed of sputtered film of chalcogenide glass doped with Erbium is disclosed. The amplifier includes a substrate, a thick film of chalcogenide glass disposed on the substrate, a pumping device, and an optical combining device, wherein the waveguide is operable to amplify the optically combined signal. This type of amplifier has been shown to be compact and cost-effective, in addition to being transparent in the mid-IR range as a result of the low phonon energy of chalcogenide glass.

2 Claims, 5 Drawing Sheets

Fig. 6. Internal gain as a function of pump power.

WAVEGUIDE AMPLIFIER IN A SPUTTERED FILM OF ERBIUM-DOPED GALLIUM LANTHANUM SULFIDE GLASS

The present invention relates generally to a waveguide amplifier. More specifically, the present invention relates to an amplifier, disposed on a substrate, composed of a sputtered film of chalcogenide glass doped with Erbium.

BACKGROUND OF THE INVENTION

An integrated-optic (IO) geometry for active waveguide devices possesses several desirable features. This device allows active components to be combined with passive components on a single substrate, resulting in a reduction in device size and cost. Furthermore, higher rare earth (RE) dopant concentrations may be possible in IO waveguides than in conventional doped optical fibers because in some chalcogenide as well as non chalcogenide glasses the presence of RE ions may increase the tendency towards crystallization during the fiber draw process. Crystallization can lead to high propagation losses or even breakage of the fiber.

In IO waveguides, any RE dopant concentration is possible in principle as long as the composition lies within the glass-forming region. As a result, active IO devices have the potential for high gain per unit length. Therefore, optical amplification can be accomplished in a shorter distance resulting in more compact and lower cost devices for applications such as telecommunications and gas sensing.

The chalcogenide glasses (ChG's) can be good candidates for use in RE doped amplifiers and lasers operating at wavelengths from the telecommunications bands through the long-wave IR. These glasses exhibit low phonon energies, resulting in transparency in the mid wave and long wave IR spectral regions. Furthermore, these glasses permit transitions that are not possible in silica and phosphate glasses due to multiphonon quenching. ChG's have been used previously in the fabrication of fiber lasers as well as in optically written IO lasers. They have not, however, been previously used in erbium-doped waveguide amplifiers (EDWA's).

Gallium lanthanum sulfide (GLS) is a type of chalcogenide glass that may be particularly well-suited for use in EDWA's. It has a wide IR transmission window, with transmission of 50% or higher through a 1 mm thickness over a wavelength range of 0.5 to 10 μm. Its high glass transition temperature relative to that of other chalcogenide glasses, $T_g$=580° C. makes GLS appropriate for use in high-temperature applications. Additionally, high RE dopant concentrations without clustering are possible because RE ions are able to substitute for lanthanum ions in the glass matrix. Clustering of the RE ions can lead to a reduction in amplification per unit length within the material. The potential of GLS as a laser material has been demonstrated in $Nd^{3+}$-doped bulk glass lasers and $Nd^{3+}$-doped fiber lasers. In addition, the spectral properties of bulk $Er^{3+}$-doped GLS have been well-characterized.

Previous efforts to fabricate IO waveguides in GLS glass have utilized the fact that the glass exhibits a photoinduced refractive index change when exposed to above bandgap radiation—light with a wavelength of less than approximately 0.5 nm. Waveguides written in polished bulk samples with propagation losses of <0.5 dB/cm have been achieved. However, forming a waveguide in a thin film of sputtered GLS, possess several advantages over waveguides written in polished bulk glass. A sputtered film can be made with high compositional uniformity and with fewer of the local defects that can be present in bulk glass. In addition, deposition results in improved design flexibility, the sputtered film can be prepared on a plurality of substrates, thus facilitating integration with other IO devices. Further, the glass is deposited with greater precision and thereby potentially reducing cost. In addition, previous efforts have included fiber based optical amplifiers that are operable in the telecommunications arena. While these fiber-based amplifiers have become a key technology for long haul communications networks, where transmission distances are typically >300 km. they are bulky and costly. There is a need for smaller, lower cost amplifiers with less demanding performance requirements that can be easily installed in smaller networks. IO waveguide amplifiers can satisfy these requirements.

Optical losses are reduced as a result of improved compositional uniformity and a lack of the local defects that are present in glass melts. The ability to deposit the active glass only where it is needed leads to more flexibility in device design, compatibility with a variety of substrate materials, and more straightforward integration with other IO devices. Cost is reduced because the active glass is deposited only where needed, so a smaller volume is required than for a bulk sample.

BRIEF SUMMARY OF THE INVENTION

The above described disadvantages are overcome and advantages realized by the present invention including a signal amplification device for use with a signal generator capable of producing an input signal. The device comprises a substrate, a thick film chalcogenide glass planar waveguide disposed on the substrate, the planar waveguide is doped with rare earth ion elements, a pumping device operable to generate pump energy, and a coupling device operable to optically combine the input signal with the pump energy. The thick film chalcogenide glass planar waveguide is operable to receive the combined signal and pump energy, and the thick film chalcogenide glass planar waveguide is operable to amplify the coupled signal.

Another embodiment of the present invention includes a device for use as a waveguide laser, comprising a plurality of reflective devices and a thick film chalcogenide glass planar waveguide disposed on a substrate. The planar waveguide is doped with rare earth ion elements, and an optical pump device is operable to deliver pump energy to the waveguide. The first of the plurality of reflective devices is proximate to the pump device and a second of the plurality of mirrors is disposed distal to the pump device. The plurality of reflective devices is operable to oscillate an optical signal resulting from stimulated emission from the rare earth ions. The pump energy maintains a plurality of rare earth ions in an excited state to maintain stimulated emission from the rare earth ions, and the waveguide is operable to guide the optical signal between the reflective devices.

BRIEF DESCRIPTION OF THE DRAWINGS

These and other aspects, advantages mid novel features of the invention will be more readily appreciated from the following detailed description when read in conjunction with the accompanying drawings, in which.

DETAILED DESCRIPTION OF THE PREFERRED EMBODIMENT

Figure 1:
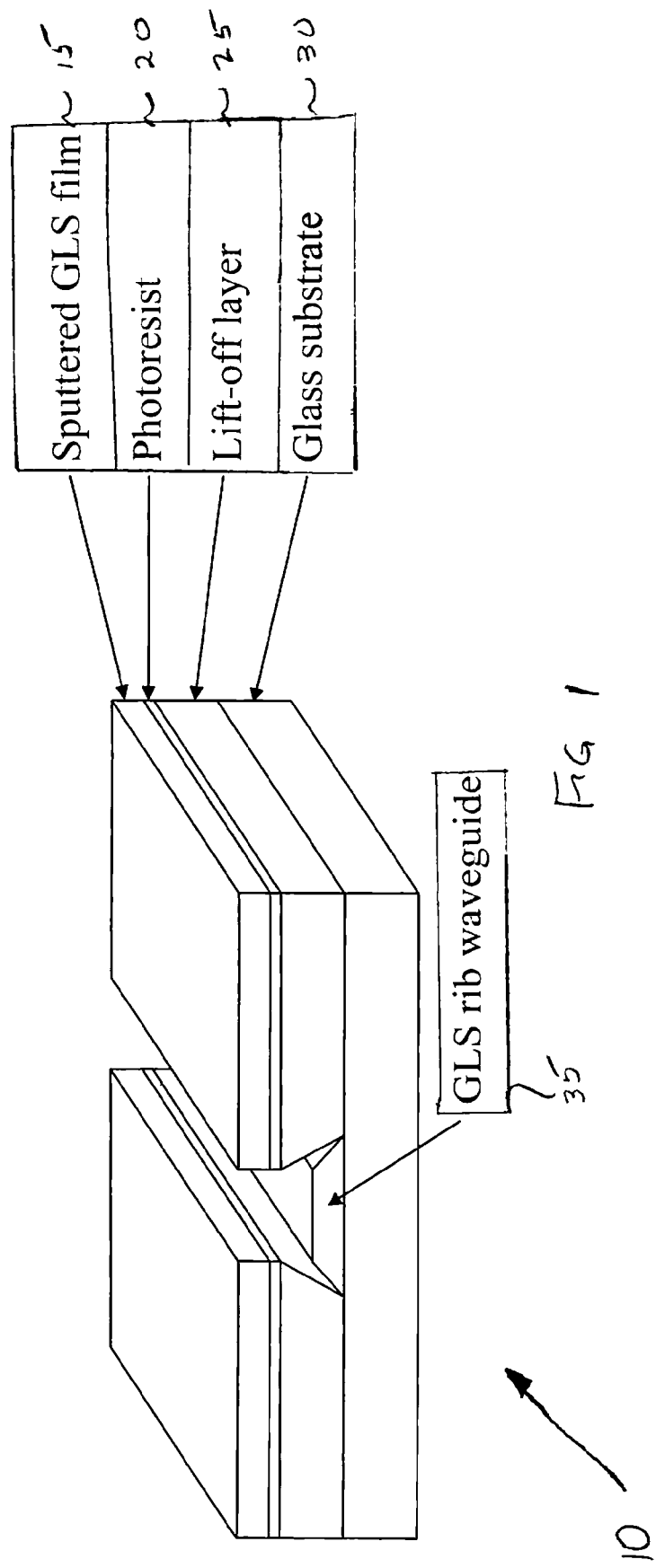
FIG. 1 is an illustration of the erbium doped chalcogenide glass planar waveguide constructed according to an embodiment of the present invention.

Most glasses in use today are silicate glasses—they are based on networks of $SiO_2$ molecules. While silicate glasses can transmit visible and near-IR light (up to a maximum wavelength of approximately 2-3 μm) their transmittance falls off in the mid-IR. The mid-IR absorption can be caused by light interacting with phonons—vibrational resonances of the atoms within the glass. In other words, the atoms within the glass can vibrate in the presence of the electromagnetic field of the incident light, absorbing the light in the process. Visible light can pass through the glass because its frequency is high enough that it does not excite phonon resonances.

Chalcogenide glasses, on the other hand, are based on sulfur, selenium, or tellurium rather than oxygen. These elements are larger and heavier than oxygen. The chalcogenide glasses can posses excellent transmittance in the near IR (in wavelength range of approximately 0.7-3 μm) and are thus useful for devices operating in this spectral region. Additionally, they are able to transmit longer wavelengths (lower frequency) of light in comparison to non-chalcogenide glasses because the chalcogenide glasses require lower frequencies of light than do silicate glasses, for example, to resonate. Depending on the particular glass composition with respect to the various elements sulfur, selenium, and tellurium, as well as other glass constituents, chalcogenide glasses can transmit wavelengths as long as about 12 μm. This characteristic of mid-IR transmittance is sometimes described as the "low phonon energy" of the chalcogenide glasses. Chalcogenide glasses typically have phonon energies of 200-450 $cm^{-1}$, whereas silicate glasses typically have phonon energies of about 1100 $cm^{-1}$. Fluoride glasses have phonon energies of about 560 $cm^{-1}$, so they transmit further into the infrared than do silicate glasses but not as far as chalcogenide glasses.

When these chalcogenide glasses are doped with rare earth ions, the glasses can be used to make optical amplifiers and lasers. The rare earth ions, other than Gd and Yb, possess numerous transitions in the 0.7-12 μm range, thus when optically pumped to an excited state these rare earth ions emit light in this wavelength range. Although the rare earth ion erbium is used in the present invention, other rare earth ions can be employed, for example, praseodyium, holium, cerium, samarium, europium, erbium, ytterbium, neodymium, terbium, dysprosium, and thulium. Transitions in the 3-12 μm range range are unusable in silicate glasses as a result of multi-phonon quenching. As discussed above, silicate glasses don't transmit mid-IR light, so transitions that would otherwise emit mid-IR photons are unusable. Chalcogenide glasses, on the other hand, provide a medium for the rare earth ions in which wile can take advantage of their mid-IR transitions on account of the low phonon energies of the glasses. In summary, it is possible to make a mid-IR amplifier or laser in a rare earth doped chalcogenide glass but not in a rare earth doped silicate glass.

FIG. 1 illustrates an erbium doped chalcogenide glass planar waveguide 10 constructed according to an embodiment of the present invention. The type of chalcogenide glass employed within the waveguide is gallium lanthanide sulfide. As previously mentioned, chalcogenide glasses employing rare earth ions work well as amplifiers in the telecommunications bands (e.g., 1460-1625 nm.) through the long-wave IR band (up to 12 μm). The waveguide 10 is comprised of a plurality of layers including a sputtered film of GLS 15 of approximately 1-20 μm, a photoresist layer 20 of approximately 0.5-2 μm, a lift-off layer 25 of approximately 1-20 μm and a glass substrate 30. Other types of inorganic substrates could be employed as well. The GLS rib waveguide 35 lies in a channel within this plurality of layers and has dimensions of width approximately 2-20 μm and a length of approximately 1-10 cm. The waveguide 35 has a depth of approximately 1-10 μm.

Figure 2:
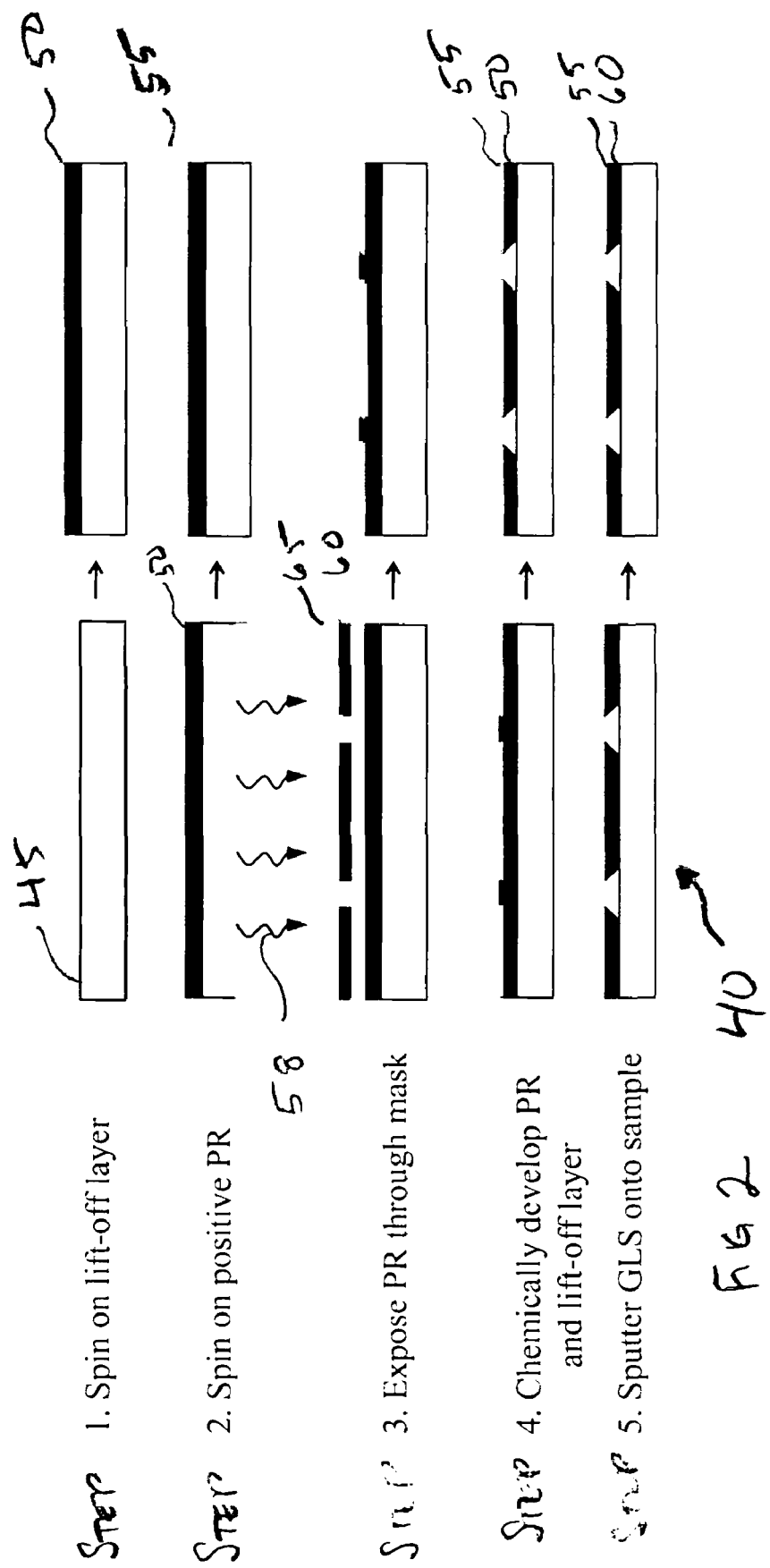
FIG. 2 is a schematic diagram of the lift-off fabrication process showing a cross section of two waveguides.

The GLS rib waveguide 35 is formed via a lift-off fabrication process as depicted in FIG. 2. A two inch diameter fused silica substrate 45 can be coated with a sixty Å layer of Cr (not depicted in FIG. 2) via sputtering in order to act as an adhesion layer, or other suitable adhesion layers can be employed such as titanium. A thick (approximately 3.7 μm) polyimide lift-off layer 50 was spun onto the substrate 45 followed by a 1.1 μm thick layer of positive photoresist 55. The positive photoresist layer 55 can be patterned with straight lines 10 μm in width by exposing through a photo-mask 65 (e.g., a plate that is optically transmissive over only a portion of the surface.) The photoresist and lift-off layer were developed and the underlying lift-off layer acquired an undercut profile owing to its higher etch rate.

In operation, step 1 depicts the lift-off layer being placed on the substrate 45. Step 2 allows the positive photoresist layer 55 being spun onto the substrate 45. Step 3 involves exposing the photoresist layer to a light 58 via a mask 65 to perform patterning of the positive photoresist 55. Step 4 depicts the chemical development of the photoresist layer 55 and the lift-off layer 50, resulting in an undercut profile of the lift-off layer. Step 5 depicts the deposition of GLS glass onto the sample, forming the waveguide.

A bulk glass ingot of GLS glass can be ground into a powder, and a sputter target can be formed by hot pressing this powder into a 3 inch diameter disk. GLS can be deposited by RF magnetron sputtering in a sputter-up geometry onto an uncoated or a photoresist-coated substrate. This process can be carried out in an Ar atmosphere with a pressure of 5 mTorr and a flow rate of 20 sccm. The above described process employs an energy density of 1 $W/cm^2$ and the substrate temperature can be maintained at 100° C. The resulting deposition rate can be 11 Å/min.

A strip waveguide may be cleaved perpendicular to the waveguides, on either end, thus forming a waveguide 2.4 cm. in length, as shown in FIG. 1.

Figure 3:
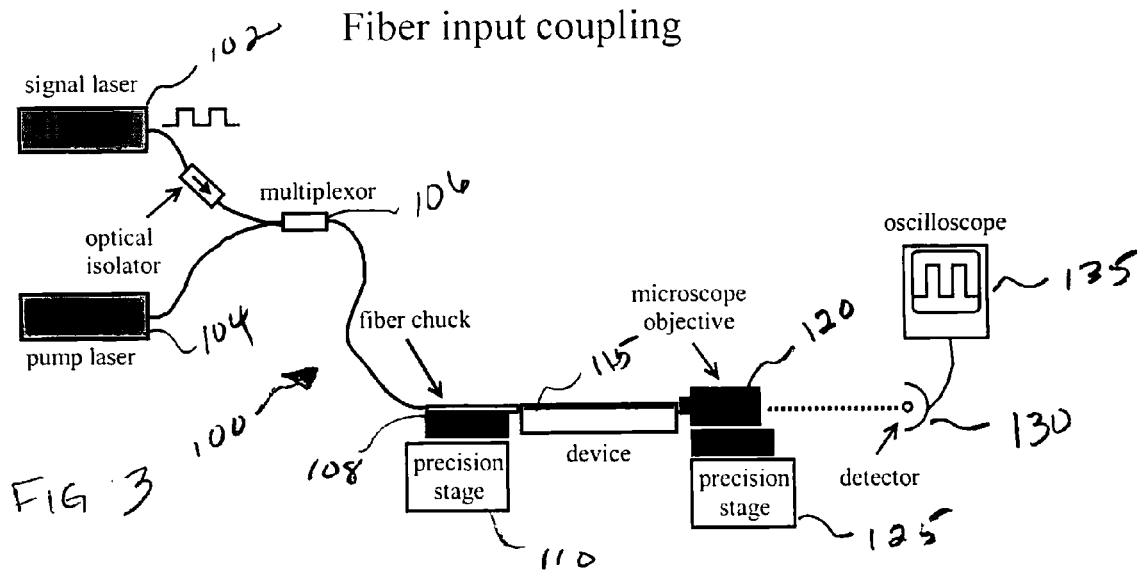
FIG. 3 depicts another embodiment of the erbium doped chalcogenide glass planar waveguide employing fiber input coupling constructed according to a second embodiment of the present invention.

FIG. 3 illustrates a first embodiment of the thick film chalcogenide planar waveguide employing fiber optic input coupling. The device 100 comprises a signal laser 102 at the first wavelength or other type of signal generator, a pump laser 104 at the second wavelength or other type of optical pumping device operable to produce pump energy, a multiplexor 106 or other type of optical combining device, a fiber chuck 108, a precision stage 110, the GLS waveguide 115, microscope objective 120, precision stage 125, detector 130, oscilloscope 135 or other type of processing device. Signal laser 102 generates a square signal of with a wavelength of 1550 nm.

In operation, multiplexor 106 optically combines the signals from the signal laser 102 and energy from the pump laser 104 to allow the both signals to be combined. The combined signal travels via a fiber that is held in place proximate to the waveguide 115 by the fiber chuck 108. Precision stage 110 aligns fiber chuck 108 at an appropriate position to couple to waveguide 115. The combined signal is then amplified through the waveguide 115. The amplified signal is collimated via microscope objective 120 to detector 130. Microscope objective 120 is appropriately aligned to waveguide 115 via precision stage 125. The amplified signal is then detected by detector 130 and displayed via oscilloscope 135. In an additional embodiment of the present invention the multiplexor can be removed and a beam splitter or a dielectric mirror can be employed, for example.

Amplification within the waveguide occurs as a result of the process of stimulated emission; when a rare earth ion absorbs a photon from the energy pumping device, it can realize an excited state. When perturbed by an incident photon with a specific energy, for example a photon from the signal laser 102, it can emit light with the same wavelength as that of the incident photon. Therefore, when a plurality of rare earth ions are in an excited state, a single incident photon can generate multiple emitted photons, thus optical amplification can occur, as occurs in waveguide 115.

Figure 4:
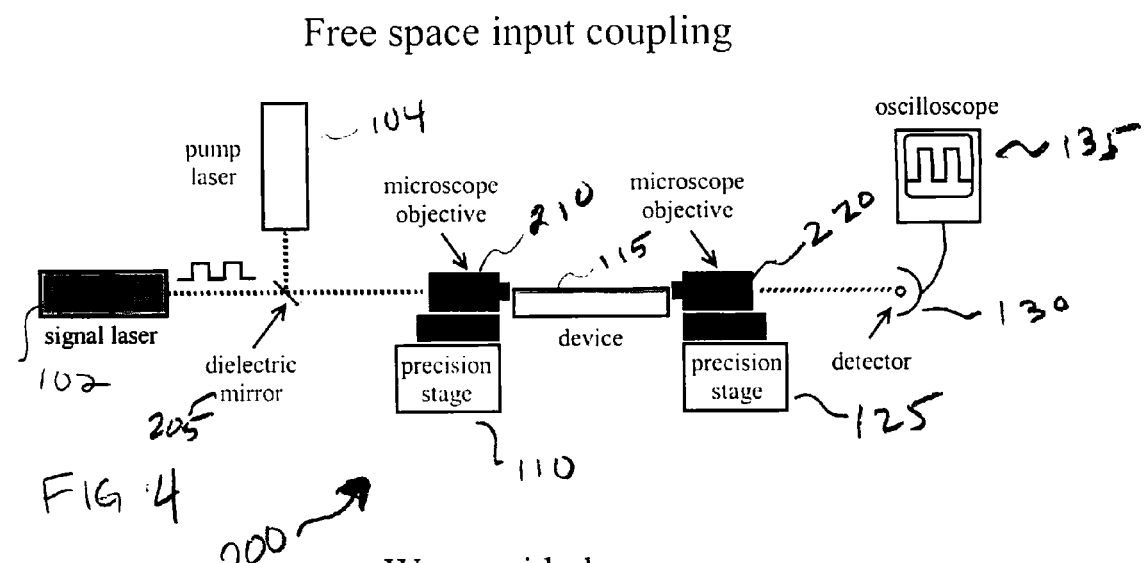
FIG. 4 illustrates a further embodiment of the erbium doped chalcogenide glass planar waveguide employing free space input coupling constricted according to a third embodiment of the present invention.

FIG. 4 illustrates an additional embodiment of the present invention, a free space input coupling to the GLS waveguide. The free space input coupling system 200 comprises signal laser 102, pump laser 104, a dielectric mirror 205, microscope objective 210, precision stage 110, waveguide 115, microscope objective 220, precision stage 125, detector 130, and oscilloscope 135, or other type of processing device.

In operation, dielectric mirror 205 combines the signal from signal laser 102 and energy from the pump laser 104. The combined signal is then focused via microscope objective 210 into GLS waveguide 210. Microscope objective 210 is correctly aligned with waveguide 115 via precision stage 110. The signal is then amplified via GLS waveguide 115 and the resulting signal is collimated via microscope objective 220 which is correctly aligned with waveguide 115 via precision stage 125. The collimated signal is detected by detector 130 and displayed by oscilloscope 135, or other suitable processing device.

In operation, the system 200 employs dielectric mirror 205 to combine, via free space, the signal from signal laser 102 and the energy from the pump laser 104 in free space. The combined signal is focused into GLS waveguide 115 via microscope objective 210. The signal is then amplified and then collimated into microscope objective 220. The collimated signal is detected and displayed on a suitable processing device.

Figure 5:
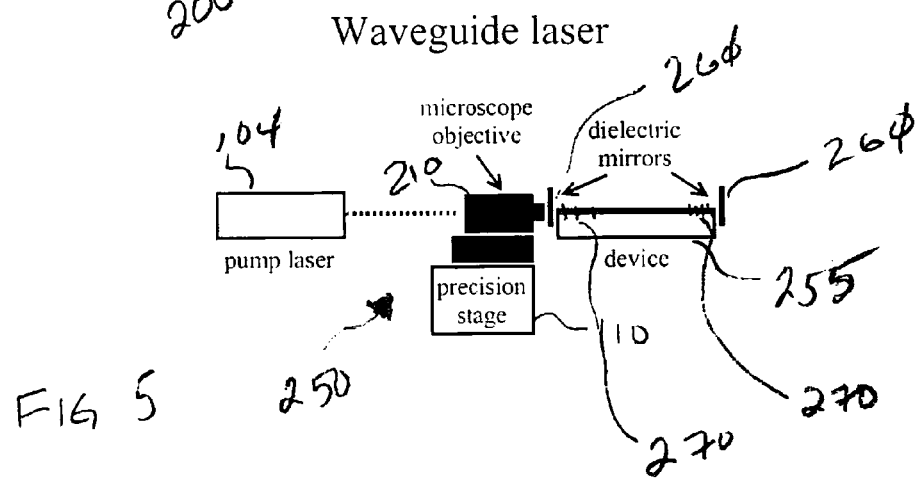
FIG. 5 illustrates an additional embodiment of the erbium doped chalcogenide glass planar waveguide employing a waveguide laser constructed according to a further embodiment of the present invention.

FIG. 5 illustrates an additional embodiment of the present invention, a waveguide laser 250. This waveguide laser 250 comprises pump laser 104, microscope objective 210, precision stage 110, GLS waveguide 255. The waveguide laser may also comprise dielectric mirrors 260 or alternatively reflective gratings 270. The dielectric mirrors 260 and the reflective gratings 270 are located on opposite ends of the GLS waveguide 255. One set of mirrors 260 being proximate to microscope objective 210 and the other set of mirrors 260 being distal to the microscope objective 210.

In operation, pump laser 104 generates light that passes into microscope objective 210. The light is then focused into GLS waveguide 255. This light is then absorbed by rare earth ions within the waveguide 255. The rare earth ions can then emit radiation at a wavelength different than that of the pump light by the process of stimulated emission. The emitted radiation then oscillates between dielectric mirrors 260 in order to generate a laser signal. Alternatively, reflective gratings 270 may be etched into the surface of the GLS waveguide 255 in order to generate the oscillated signal. Alternatively, reflective gratings 270 may be deposited onto the surface of the GLS waveguide 255 in order to generate the oscillated signal. Alternatively, reflective gratings 270 may patterned within the thickness of GLS waveguide 255 by photowriting or ion exchange in order to generate the oscillated signal.

Figure 6:
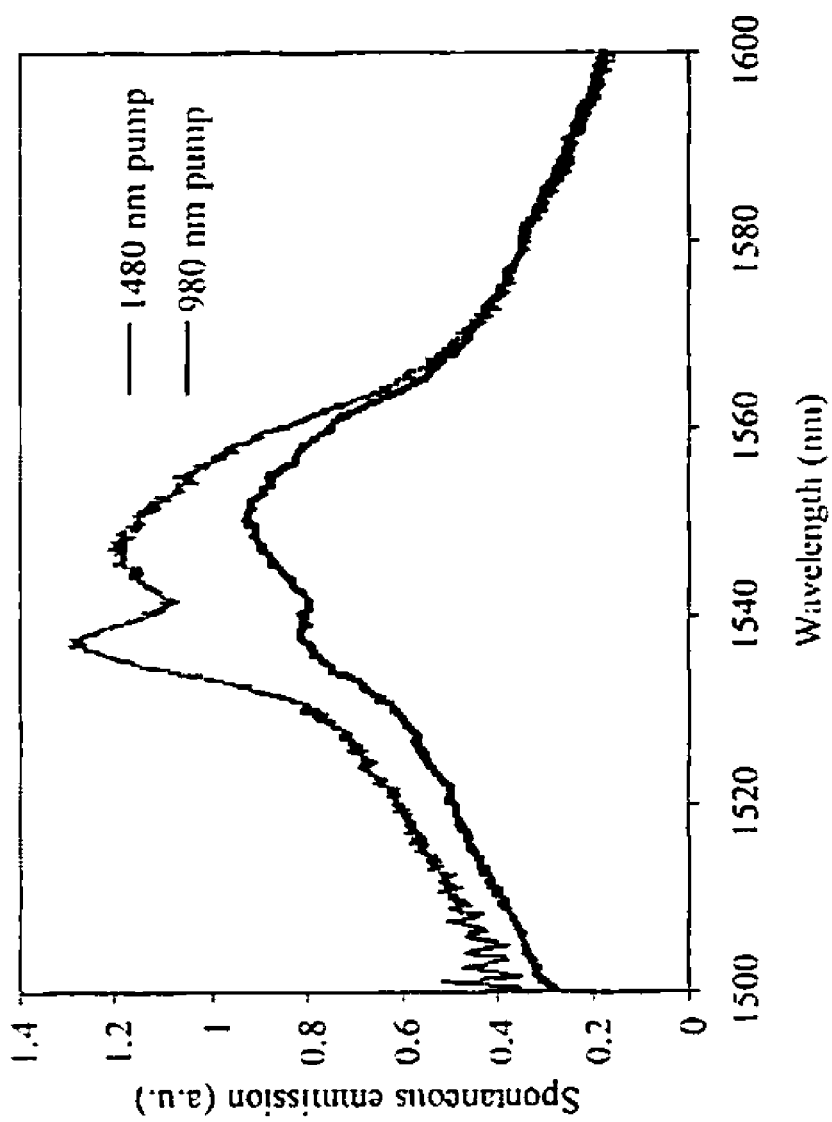
FIG. 6 is a graph illustrating spontaneous emission from a waveguide when pumped with 1480 nm and 980 nm wavelength light.

FIG. 6 illustrates the magnitude of spontaneous emission from a waveguide when pumped with 1480 nm, the upper plot on FIG. 6 and 980 nm wavelength light, the lower plot on FIG. 6. When pumped with a 1480 nm source, the peak emission occurred at a wavelength of 1537 nm with a smaller local maximum at a wavelength of 1547 nm. When pumped with a 980 nm source, the peak emission occurred at a wavelength of 1551 nm with a smaller local maximum at a wavelength of 1538 nm. The difference between the two spectra can be the result of the difference in absorption cross section for the two wavelengths. The absorption at 980 nm is greater than it is at 1480 nm, so the 980 nm pump is absorbed, on average closer to the input of the waveguide. When viewed during operation, green luminescence resulting from upconversion is visible along the entire length of the waveguide.

The above refers to near-IR operation, however, the present invention has also been known to operate in the mid-IR (e.g., 3-12 µm) wavelength range. Mid-IR lasers are of interest for applications such as infrared countermeasures, for example, devices that use an infrared source directed onto the sensor of an anti-aircraft missile, preventing its homing mechanism from maintaining a lock on the intended target, and thus preventing the missile from striking the aircraft. An additional application of mid-IR lasers includes employing them in an IO gas sensor. For example, these gas sensors could be employed in a hazardous gas detection unit as a safety measure in an industrial environment.

Figure 7:
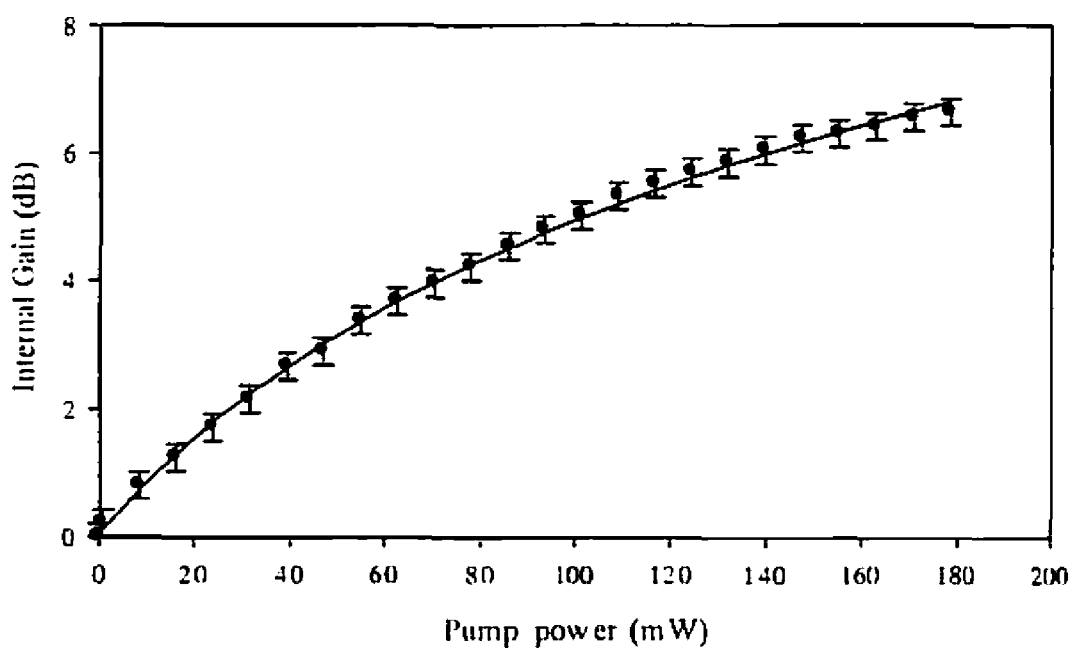
FIG. 7 is a graph illustrating the internal gain of the erbium doped chalcogenide glass planar waveguide constructed according to an embodiment of the present invention, as a function of pump power.

FIG. 7 is a plot of the internal gain as a function of pump power initiated by a laser pump, for example. The internal gain is defined as $10 \log(P_g/P_0)$ where $P_g$ is the peak power of the square wave at the detector in the presence of the pump, and $P_0$ is the peak power of the square wave with no pump present. The maximum internal gain of 6.7 dB occurs with a pump power of 180 mW, as illustrated in FIG. 7. This value corresponds to an internal gain per unit length of 2.8 dB/cm. This amplification was measured with the lift-off layer 25 and photoresist layer 20 still in place.

Several improvements can result in lower-loss waveguides and thus lead to better performance amplifiers and lasers. The present invention has employed a lift-off technique, however it can be possible to achieve lower loss waveguides by sputtering a uniform film and performing a dry etch. Further, a cladding layer of sputtered undoped GLS or other suitable chalcogenide glass can be included above and/or below the rare earth ion coating in order to reduce propagation losses. Furthermore, a higher GLS deposition rate than the current rate of 11 Å/min. can be achieved by using an energy density at the sputter target of >1 W/cm$^2$. For example, a GLS deposition rate of >100 Å/min. can be achieved by using an energy density at the sputter target of approximately 5 W/cm$^2$. The higher rate can result in much shorter deposition times and facilitate sputtering GLS for commercial applications. A further alternative for use in the present invention includes substituting other rare earth ions for erbium, as mentioned above. These substitutes include, Ce, Pr, Nd, Pm, Sm, Eu, Tb, Dy, Ho, Er, Tm, and Yb. In addition the thick film chalcogenide glass can include the elements of S, Se. and Te and their mixtures. Finally, the present invention can also be used as an integrated optic waveguide laser if sufficient gain were present and input and output reflectors were added.

Although only several exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of this invention as defined in the following claims.

What is claimed is:

1. A signal amplification device for use with a signal generator capable of producing an input signal, said device comprising:
    a substrate;
    a thick film gallium lanthanide sulfide glass planar rib waveguide disposed on said substrate, said gallium lanthanide sulfide glass planar rib waveguide being doped with rare earth ion elements;
    an optical pumping device operable to generate pump energy; and
    a combining device operable to optically combine the input signal to the pump energy;
    wherein said thick film gallium lanthanide sulfide glass planar rib waveguide is operable to receive the optically combined signal from said combining device,
    wherein said thick film gallium lanthanide sulfide glass planar rib waveguide doped with rare earth ion elements operable to amplify the optically combined signal,
    wherein said gallium lanthanide sulfide glass planar rib waveguide is doped with rare earth ion element Er,
    wherein said gallium lanthanide sulfide glass planar rib waveguide comprises a thickness of 1-10 µm.

2. A device for use as a waveguide laser, said device comprising:
    a plurality of reflective devices;
    a thick film gallium lanthanide sulfide glass planar rib waveguide disposed on a substrate, said gallium lanthanide sulfide glass planar rib waveguide being doped with rare earth ion elements; and
    an optical pump device operable to generate pump energy to said waveguide;
    wherein a first of said plurality of reflective devices proximate to said pump device and a second of said plurality of reflective devices disposed distal to said pump device, and said plurality of reflective devices operable to oscillate an optical signal resulting from stimulated emissions from the rare earth ions, said pump energy maintains a plurality of rare earth ions in an excited state to maintain stimulated emission from rare earth ions, and said waveguide operable to guide said optical signal between said reflective devices,
    wherein said gallium lanthanide sulfide glass planar rib waveguide is doped with rare earth ion element Er,
    wherein wherein said gallium lanthanide sulfide glass planar rib waveguide comprises a thickness of 1-10 µm.

\* \* \* \* \*